United States Patent

[11] 3,601,538

[72] Inventors Peter J. May
Webster;
Uno Randmere, Rochester; Frederick C. Sabernick, Fairport; Morris A. Suntop, Rochester, all of, N.Y.

[21] Appl. No. 801,590
[22] Filed Feb. 24, 1969
[45] Patented Aug. 24, 1971
[73] Assignee Stromberg-Carlson Corporation

[54] CARRIER AND VOICE-FREQUENCY TELEPHONE SYSTEM
15 Claims, 3 Drawing Figs.

[52] U.S. Cl. .......... 179/2.5
[51] Int. Cl. .......... H04h 1/08
[50] Field of Search .......... 179/15, 2.5

[56] References Cited
UNITED STATES PATENTS 3,510,584 5/1970 Krasin .......... 179/5.2

*Primary Examiner*—Ralph D. Blakeslee
*Attorney*—Charles C. Krawczyl

ABSTRACT: This system serves the purpose of providing private line service over an existing telephone line and includes a central office terminal at one end of the line and a subscriber terminal at the other end of the line. Physical phones may be connected to the existing line and a line circuit at the central office is coupled to the line for connecting the central office equipment to the phones. Both the subscriber and the central office terminals have transmitting channels in which a carrier oscillator signal may be modulated and applied to the line. The control functions in the system are operated in response to the absence or presence of carrier oscillations on the line. Circuits are provided at the central office terminal which are responsive to a reception of a carrier signal transmitted from the subscriber terminal, or in off-hook condition of one of the physical phones for turning on the central office terminal carrier oscillator. The subscriber terminal has a battery which is connected to the line to receive charging current therefrom in the absence of central office terminal carrier signals and is disconnected from the line in response to the presence of central office carrier signals. Ringing current for the telephone which is connected to the subscriber carrier terminal is generated by modulating the central office carrier. The modulated carrier operates the ringer circuitry at the subscriber carrier terminal. Both the subscriber carrier terminal and the central office terminal therefore cooperate with each other to produce the requisite control functions.

INVENTORS.
PETER J. MAY
UNO RANDMERE
FREDERICK C. SABERNICK
MORRIS A. SUNTOP
BY
ATTORNEY

INVENTORS.
PETER J. MAY
UNO RANDMERE
FREDERICK C. SABERNICK
MORRIS A. SUNTOP
BY
ATTORNEY

INVENTORS.
PETER J. MAY
UNO RANDMERE
BY FREDERICK C. SABERNICK
MORRIS A. SUNTOP

ATTORNEY

CARRIER AND VOICE-FREQUENCY TELEPHONE SYSTEM

The present invention relates to telephone systems and particularly to a carrier system which provides facilities for connecting additional parties to existing telephone lines.

The invention is especially suitable for use in 18,000-feet telephone systems where a central office is connected to subscribers over relatively long telephone lines when it is desired to add additional subscribers to the lines. The invention however, may also be used in providing service under circumstances where it would be difficult to provide an additional telephone circuit such as where an additional private line is requested in an existing residence, or in rural areas.

Although carrier systems for providing additional service over existing telephone lines have been suggested, such systems have serious drawbacks, particularly as regards reliability and cost. For example, some systems have unduly interferred with normal functions of existing voice frequency telephone circuits. These circuits are referred to as physical telephone circuits since they are direct current coupled to the telephone line. Particular difficulties present themselves in the manner in which power sources are provided for the remote subscriber terminal. It is sometimes desirable to mount this terminal on the telephone pole in the vicinity of the additional carrier telephone set. Also, the power source (e.g., a battery) must be maintained in a charged condition. To this end, it is desirable to connect the battery to the telephone lines and charge it from the central office current which flows along that line. If the central office battery is connected when the carrier phones are in use, line-loading problems may result which can interfere with telephone signalling (e.g., dialing) and distort the voice signals. It is a feature of this invention to provide means for controlling battery circuits of a carrier telephone system so as to assure that there will be no interference with normal telephone functions.

Another problem encountered in carrier telephone systems is in affording ringing current to the subscriber carrier telephone set. In some cases, special ringing oscillators have been provided which are operated in response to transmitted ringing control signals. The use of such oscillators increases the cost and complexity of the system and further, may produce ringing current of a frequency different than normally in use. Thus, the carrier subscriber telephone must be provided with a different ringer device than the physical subscriber telephones. This complicates logistics for telephone companies. It is a feature of this invention to provide ringing current without the need for separate ringing generators and at normal ringing frequencies.

Accordingly, it is an object of the present invention to provide an improved carrier system for furnishing additional service over existing telephone lines.

It is another object of the present invention to provide an improved carrier system having subscriber terminals operated by central office power in a manner which does not interfere with normal telephone functions, such as signalling, and which does not distort voice transmission.

It is a further object of the present invention to provide an improved carrier telephone system which is adapted to share the same line as physical telephone circuits.

It is a still further object of the present invention to provide a carrier telephone system in which ringing is effected simply and without complicated additional equipment.

It is a still further object of the present invention to provide an improved carrier telephone system wherein the ringing frequencies available in existing physical telephone circuits may be used.

It is a still further object of the present invention to provide an improved carrier telephone system which is adapted to share the same telephone line as existing physical telephone circuits and which is adapted to provide multifrequency party line service.

Briefly described, a telephone system embodying the invention includes physical telephone circuits for transmitting and receiving voice frequency signals over a telephone line. A carrier system is provided, which may include a terminal located at a central office and a terminal which may be located near the subscribers desiring service, for transmitting and receiving voice modulated carrier frequency signals over the same telephone line. Control means are provided for the carrier system which are responsive either to the use of the system for transmission of carrier signals or the use of the physical telephone circuits, so as to provide control signals which may be used for various purposes including the connection of local power source, such as a battery, in charging relationship with the telephone line.

The invention itself, both as to its organization and method of operation, as well as additional objects and advantages thereof will become more readily apparent from a reading of the following description in connection with the accompanying drawings in which.

Figure 1:
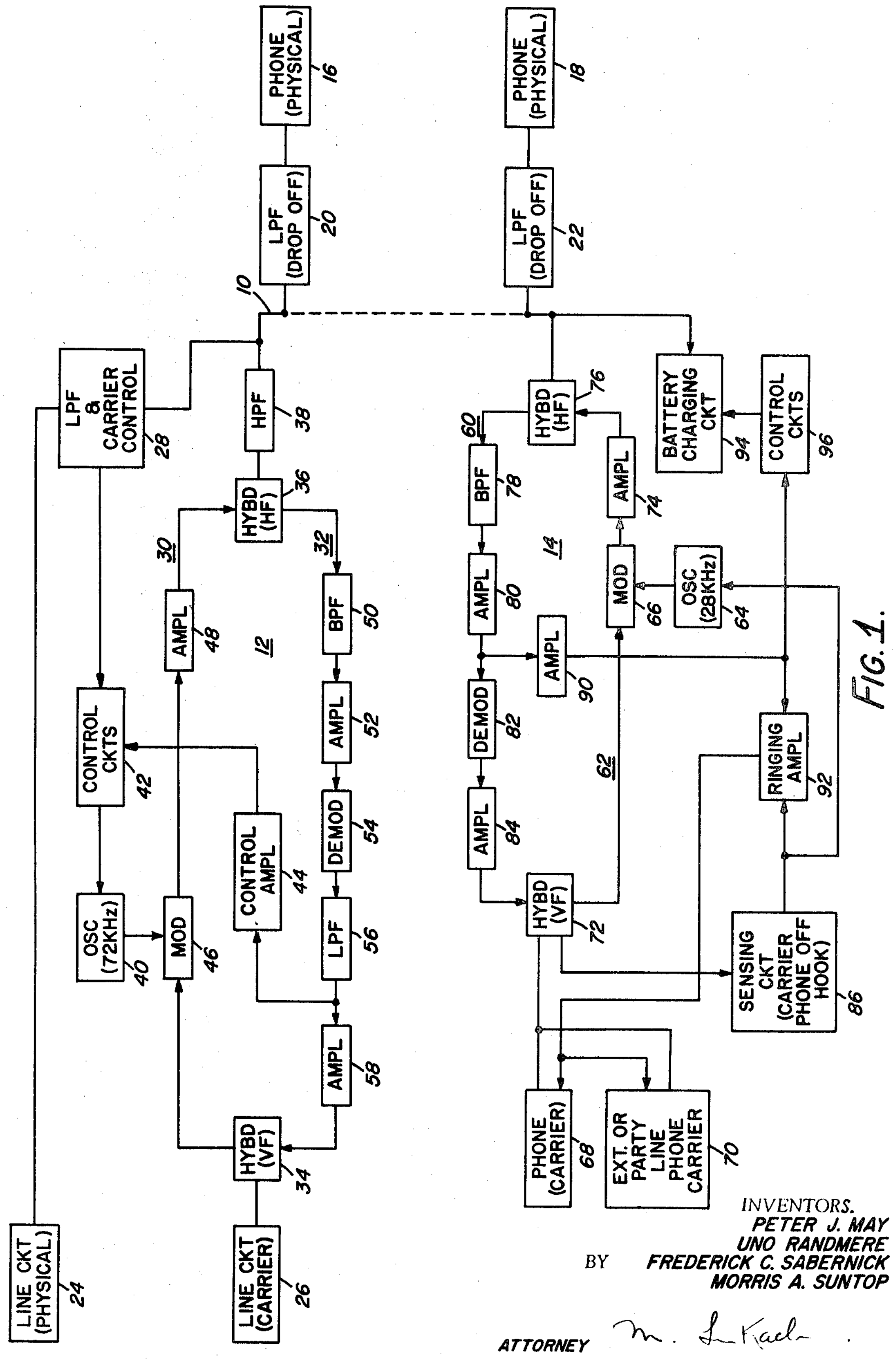
FIG. 1 is a block diagram of a telephone system embodying the invention having a central office terminal and a subscriber terminal which may be coupled to a telephone line, together with physical telephone circuits.

Referring more particularly to FIG. 1, there is shown a physical telephone line 10 which extends from a central office terminal 12 to a subscriber terminal 14. The terminal include circuits which provide a carrier telephone system for transmitting carrier signals over the line 10. Any number of telephone sets, which may be operated on a party line basis and are indicated in the drawing as physical phones 16 and 18, may be connected through low-pass drop-off filters 20 and 22 to the line 10.

The central office terminal is connected to a line circuit 24 which serves the physical phones, as well as to a line circuit 26 which serves the phone connected to the carrier system. The physical phone line circuit also provides the means for applying central office battery current to the transmission line 10 and is connected to that line 10 through a low-pass filter and carrier control relay circuit 28 which serves to isolate the physical line circuit 24 from high frequency carrier signals which may be transmitted along the line 10, as well as for control of the carrier system, as will be more fully discussed hereinafter.

The central office terminal portion of the carrier system has a transmit channel 30 and a receive channel 32. Coupling between the channels 30 and 32 and the line circuit 26 is by way of a voice frequency hybrid transformer 34. A high frequency hybrid transformer 36 couples the channels 30 and 32 at the opposite end thereof to the line 10 by way of a high-pass filter 38 which isolates the carrier system terminal for voice frequency signals which may be transmitted from the physical phones 16 and 18 to the physical line circuit or vice versa.

A carrier oscillator 40 is included in the transmit channel 30. This oscillator may suitably produce carrier signals at 72 kHz. Control means for the oscillator are operative to inhibit it from generating any oscillation when neither the physical phone circuits or the carrier circuits are in use. These control means include control circuits 42 which are operated by the control circuits in the carrier control portion of the circuits 28 which are connected to the line 10. The control circuits 42 are also controlled in response to received carrier signals in the receive channel 32. The received carrier signals are applied to the control circuits 42 via a control amplifier 44.

The transmit channel includes a modulator 46 which amplitude modulates the carrier oscillations from the oscillator 40 to produce a double-sideband amplitude modulated signal. The modulated carrier signal is amplified in a transmit amplifier 48 and applied to the line via the high frequency hybrid 36 and highapass filter 38.

The receive channel includes a band-pass filter 50 having a center frequency equal to the carrier frequency produced by the subscriber terminal (in the illustrated case 28 kHz. Thus, signals transmitted over the line from the subscriber terminal are extracted and amplified in a high frequency receive amplifier 52 before being applied to a demodulator circuit 54. Demodulation is followed by low-pass audio filtering in a low-pass filter 56. The received voice frequency signal is then amplified in a receive amplifier 58 and applied to the carrier line circuit 26 via the voice frequency hybrid 34.

The control circuits 42 are also associated with the dial relay circuit 59. When a carrier signal from the subscriber terminal is demodulated, the control circuit enables the oscillator 40 and connects the line circuit 26 to the output of the hybrid 36. The control circuits include a gate circuit which inhibits the operation of the oscillator under all conditions except when a physical phone goes off hook or a carrier signal is received from the subscriber terminal 14. To this end, the carrier control portion of the circuits 28 include a relay, a winding of which is also part of the low-pass filter which connects the physical line circuit 24 to the line 10, and which operates the gate in the control circuits 42 to enable the oscillator 40 to generate carrier signals. These carrier signals are generated when current is drawn in the transmission line 10 as occurs when a physical phone goes off hook. Accordingly, the oscillator 40 is normally inhibited when the system is in a quiescent state, either the reception of a subscriber carrier signal or an off-hook condition of a physical phone results in the generation central office terminal carrier. The central office terminal carrier is utilized to provide signalling and control functions in the carrier system. Control functions are therefore initiated at the central office terminal and not remotely at the subscriber terminal. This affords the feature of central office control over the system which is desirable especially since evidence of fault in the system becomes apparent at the central office. Thus, maintenance is simplified.

The subscriber terminal 14, like the central office terminal, includes a receive channel 60 and a transmit channel 62. A carrier wave oscillator 64 in the transmit channel 62 is also provided. The frequency of this oscillator is different from the frequency of the oscillator 40 in the central office terminal and may suitably be 28, Hz. A modulator 66 through which the carrier generated by the oscillator 64 is applied is included in the transmit channel 62. The input signals to this modulator are obtained from the telephone sets which are connected to the subscriber terminal. Two carrier telephone sets 68 and 70 are shown. One of these may be an extension or party line carrier phone. Both are connected to the subscriber terminal by way of a voice frequency hybrid coupling circuit 72. The subscriber terminal 14 may be located on the telephone pole and short runs of wire may be provided to connect the carrier phones to the voice frequency hybrid. The party line carrier phone 70 may be adapted for multifrequency ringing service, such that one ringing frequency will operate the first carrier phone 68 while another ringing frequency will operate the ringer of the other or party line phone 70.

The modulator 66 provides a double-sideband amplitude modulated carrier signal which is amplified in a transmit amplifier 74 and applied to the line 10 (viz way 72 a high frequency hybrid 76 which serves as a coupling circuit.

The receive channel includes a band-pass filter 78 which is tuned so that its center frequency is at the central office terminal carrier frequency (viz. 72kHz.). Its output is amplified in a high frequency amplifier 80. A demodulator 82 translates the carrier wave into voice frequency signals which are amplified in a receive amplifier 84 and are applied to the carrier phones 68 and 70 by way of the voice frequency hybrid 72.

A sensing circuit 86 is connected to the voice frequency hybrid 72 and is operative to detect the flow of current through the hybrid which accompanies either of the carrier phones 68 or 70 going off hook. The sensing circuit 86 also includes a gating circuit which is operative to inhibit the carrier oscillator 64 from generating any carrier waves, except when one of the carrier phones goes off hook. Thus, during quiescent conditions, there are no carrier waves transmitted in this system either from the subscriber terminal or the central office terminal.

Control signals, including ringing, are a function of carrier signals which are transmitted from the central office terminal 12. Means for detecting these control signals and performing the requisite control functions are therefore connected to the receive channel 60 of the subscriber terminal. These control means include an amplifier 90 which is responsive to the high frequency carrier signals received from the central office terminal, inasmuch as it is connected ahead of the demodulator 82 in the receive channel 60. When ringing current is generated by the carrier line circuit 26, the central office carrier produced by the oscillator 40 is 100 percent modulated in the modulator 46. This modulated ringing current may be at any ringing frequency which is normally used in the line circuits of the central office. Thus, the system is adapted to work with any ringing frequency which happens to be available. No additional ringing generators are required in the subscriber terminal. Ringing signals are amplified in a ringing amplifier 92 and are applied to the carrier phones 68 or 70. As soon as the carrier phones go off hook, the sensing circuit 86 which is connected to the ringing amplifier is operative to inhibit the operation thereof. Accordingly, when one of the carrier phones goes off hook, ringing stops and voice frequency communication may be initiated.

The power source for the subscriber carrier terminal, as well as for the carrier phones 68 and 70, is a battery which is charged from the telephone line when it is connected thereto by way of a battery-charging circuit 94. The transmission line carries central office battery current which is used to charge the battery in the subscriber terminal 14. In order to preclude interference with voice transmission and signalling as may occur if the battery is connected to the line 10 when the carrier phones or the physical phones are in use, the battery charging circuit 94 may then be disconnected from the line 10. To this end, control circuits 96 are provided. These control circuits are connected to the amplifier 90 and are responsive to the detection of central office carrier waves in the receive channel 60 for disconnecting the battery-charging circuit 94 from the line. Gate circuits may be included in the control circuits 96 for providing the disconnect or inhibiting function.

All of the circuits of the central office and subscriber terminals 12 and 14 may be constructed from solid state components. Thus, reliability is increased and the amount of maintenance decreased. The circuits which by way of example may be used in the central office and subscriber terminal 12 and 14 are shown in greater detail in FIGS. 2 and 3.

Figure 2:
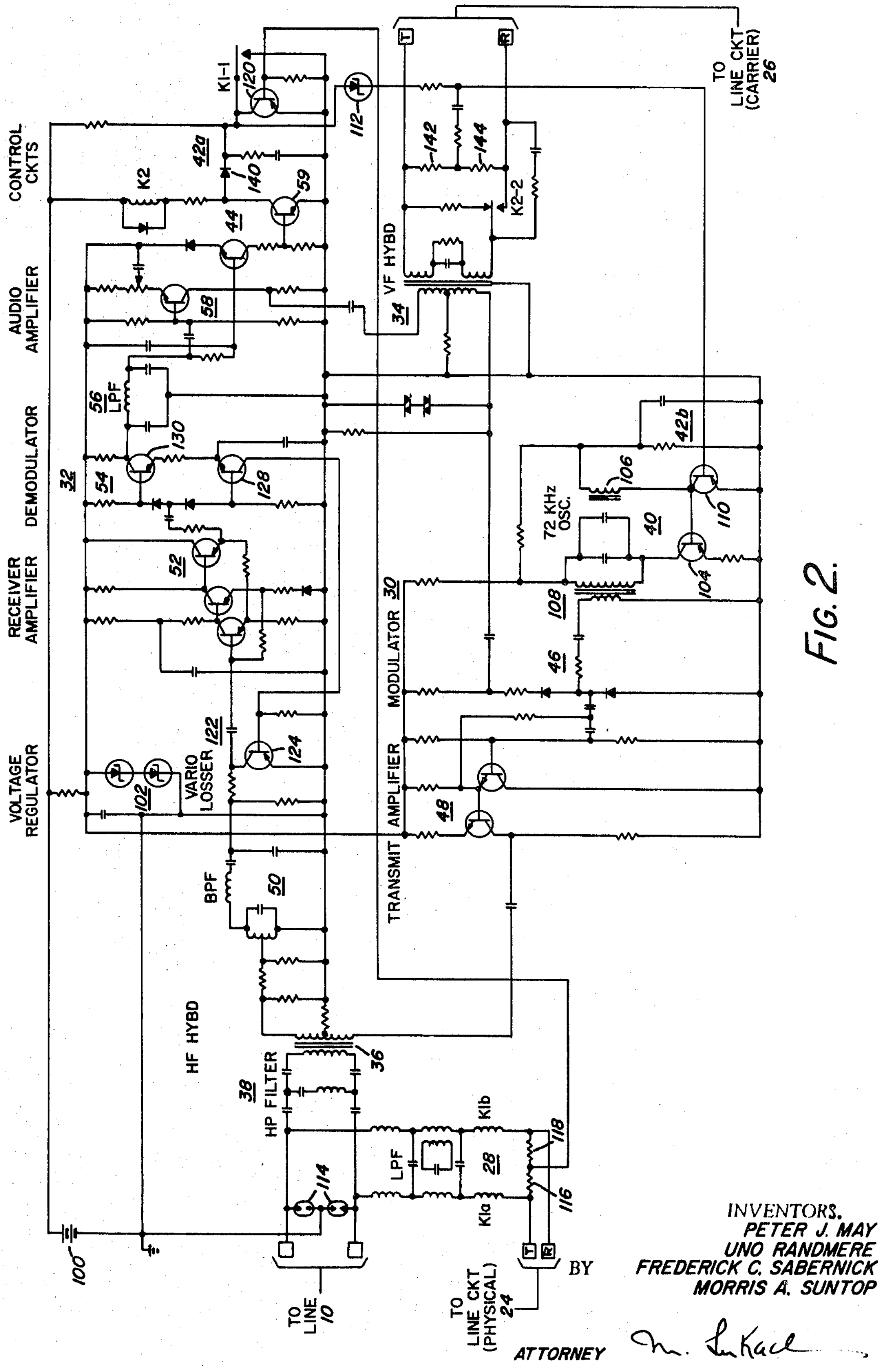
FIG. 2 is a schematic diagram of the central office terminal shown in FIG. 1.

Referring now to FIG. 2, power for the carrier system as well as for the physical phones on the line 10 is supplied from a central office battery 100, the voltage of which may suitable be 48 volts. A voltage regulator circuit 102, including a pair of zener diodes, regulates this voltage to approximately 15 volts for operating the transistor circuits of the central office terminal. The line circuit 26 is connected to the input side of the voice frequency hybrid 34. A normally open relay contact K2—2 of a relay K2 in the control circuits 42 normally disconnects the line circuit 26 from the hybrid 34. A relay contact protection circuit of a resistor and a capacitor is connected across the normally open contact K2—2. The contacts K2—2 close when subscriber terminal carrier signals are received in the receive channel 32 of the central office terminal 12.

One side of the hybrid is connected to a diode-modulating circuit 46 in the transmit channel. The output of the oscillator 40 which includes a transistor 104, having a tickler coil 106 which is part of an output transformer 108, is also coupled to the modulator circuit 46. A two-stage transistor amplifier 48 constitutes the transmit amplifier circuit and is coupled to the high frequency hybrid 36.

The control circuits 42 are shown in two parts 42*a*, and 42*b*. The control circuit 42*b*, includes a transistor 110 which is connected through a zener diode 112 to the negative side of the battery 100. Accordingly, the transistor 110 which is of the PNP type will normally be conductive, thereby shunting the base of the oscillator transistor 104 to ground and inhibiting the oscillator 40 from oscillating.

The physical line circuit tip and ring sides are connected across the central office battery. The central office battery is also connected through the inductors of the low-pass filter 28 across the physical line 10. Thus, the central office battery is connected across the physical line. A pair of gas tube safety devices 114 are also connected across the line to protect the circuits against voltage surges such as may be caused by lightning. The low-pass filter 28 is a multisection filter. The first section of the filter 28 is provided by a pair of coils Kl*a*, and Kl*b* which form the operating winding of a relay Kl. The contacts K1—1 of this relay are located in the control circuit 42*a*. The low-pass filter and carrier control function of the circuit 28 is also provided by a pair of resistors 116 and 118 which are connected across the tip and ring terminals of the physical line circuit 24. The junction between these resistors is connected to the base of a transistor 120 in the control circuits 42*a*. The transistor 120 like the contact K1—1 of the filter relay are effective to short the base drive current for the oscillator control transistor 110 to ground so as to enable the oscillator 40 to generate carrier waves, as will be more fully discussed hereinafter.

Carrier signals received from the line 10 first pass through the high-pass filter 38 and the high frequency hybrid 36 before entering the receive channel 32. The band-pass filter 50 is input connected to the hybrid via a resistor pad circuit. The output of the filter passes through a vario-losser circuit 122 including a transistor 124 which shunts the channel 32. The vario-losser operates in a closed-loop feedback circuit and includes the receive amplifier 52 ( a three-stage transistor amplifier ), rectifier/amplifier 128 and variable attenuator transistor 124. The transistors 128 and 130 function as the demodulator 54 and are biased by diodes to suitable operating points. With an increasing amplitude signal, rectification takes place across the emitter-to-base junction of the feedback transistor 128, thereby causing additional collector current to flow which biases the vario-losser transistor 124 towards saturation. The impedance provided by emitter-to-collector path of the vario-losser transistor 124 therefore decreases. The incoming signal is therefore attenuated. A decrease in the signal amplitude operates the vario-losser circuit in the opposite sense so as to decrease the attenuation or insertion loss resulting from its operation.

The low-pass filter 56 removes any harmonics resulting from the demodulation process. The signal is also somewhat amplified in the transistor 130 and is further amplified in the receive amplifier 58. The collector of the receive amplifier transistor is connected to the voice frequency hybrid 34 from which it is coupled to the line circuit 26.

Before a signal is coupled to the line circuit 26, the relay contacts K2—2 must be closed. This is accomplished with a two-stage transistor control amplifier 44, the final stage of which includes the operating winding of the relay K2. K2 also serves as the dialing relay and repeats the dialing pulses from the carrier subscriber phones which are received as bursts of carrier signal in the receive channel 32.

When the relay drive transistor becomes conductive, it also connects the base of the oscillator control transistor 110 to ground via the diodes 140 and 112. The oscillator 40 then commences to oscillate and a modulated carrier wave may be transmitted from the central office terminal to the subscriber terminal via the line 10.

The oscillator 40 is also turned on when ringing current is applied from the carrier line circuit 26 across its tip and ring terminals. A ringing signal voltage drop takes place across a pair of resistors 142 and 144 which bridges the line circuit 26. A portion of this voltage is applied to the base of the transistor 110. The transistor 110 is thereby rendered conductive once each cycle of the ringing current. The oscillator 40 is consequently pulse modulated (viz 100 modulated) and produces bursts of oscillations at the ringing frequency. Any available ringing frequency may be used; desirably the same ringing frequency will be used as is common for general ringing purposes in the central office. Since the ringers of the phones used in this system will be adapted to be operated at this ringing frequency, the carrier phones may be the same phones in general use in the telephone system associated with the central office. In other words, their ringers need not be special ringers designed to operate at any particular ringing frequency which is peculiar to the carrier system.

The low-pass filter relay Kl is operative to control the system so that central office terminal carrier is generated when any of the physical phones go off hook. If any of the physical phones do go off hook causing current to flow in the physical phone line circuit 24, the current through the relay windings Kl*a* and Kl*b* increases, thereby causing its contacts K1—1 in the control circuits to close. Base drive to the transistor 110 is thereby removed and the oscillator 40 commences to generate the carrier signals which are transmitted onto the line. Such carrier signals must be transmitted even when ringing current flows from tip to ring of the physical line circuit 24. During physical line ringing, current is, however, applied to the base of the transistor 120 and drives that transistor into conduction on the ringing peaks. The base drive to the gating transistor 110 for the oscillator transistor 104 is therefore still short circuited to ground. Accordingly, the oscillator 40 continues to produce uninterrupted carrier oscillation, even during the peaks of the physical line circuit ringing current.

Figure 3:
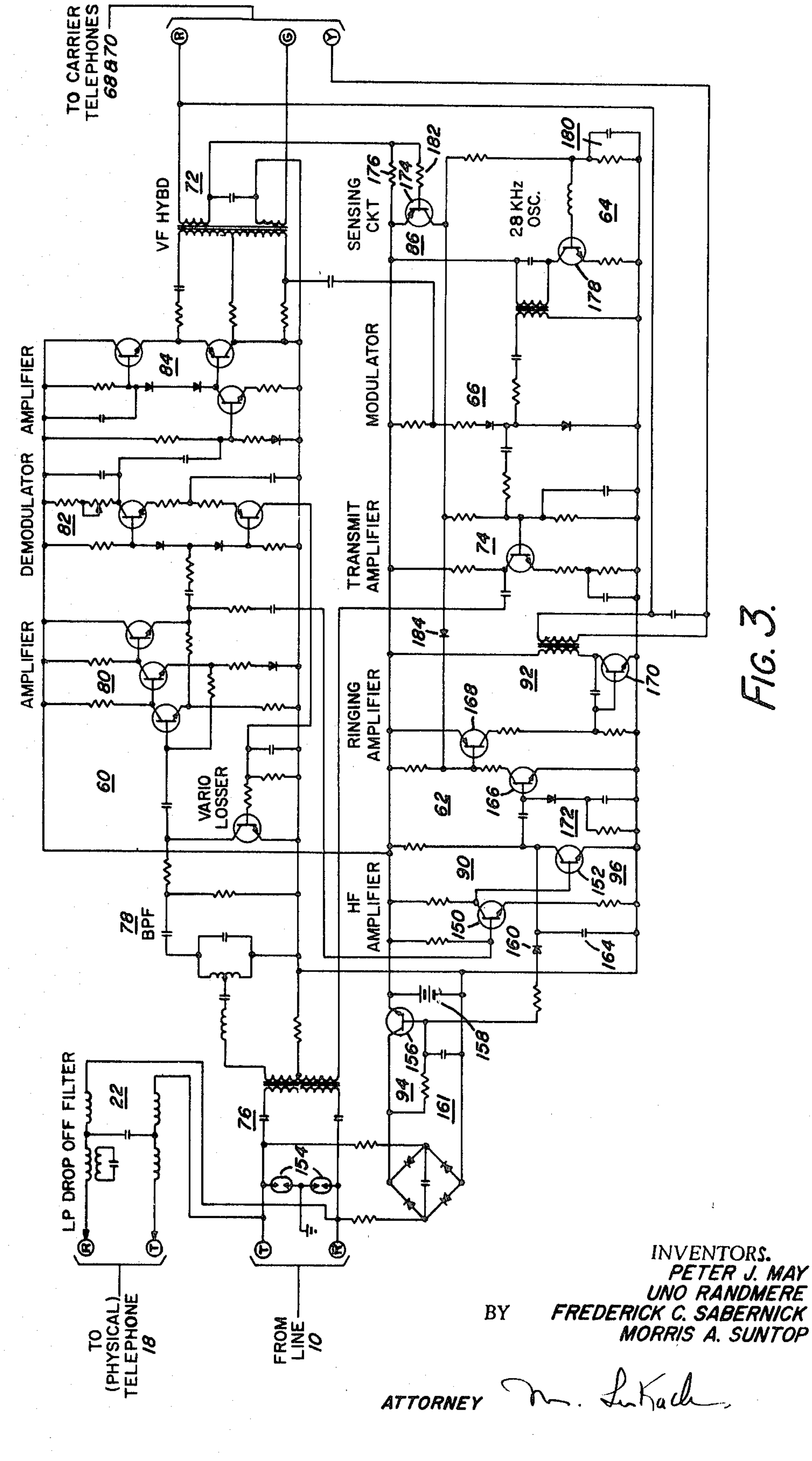
FIG. 3 is a schematic diagram of the subscriber terminal shown in FIG. 1.

Turning now to FIG. 3, it will be noted that the receive channel includes circuits generally similar to the circuits in the receive channel of the carrier office terminal. The receive amplifier output, however, is applied to the input of the amplifier 90, specifically to the base of a transistor 150 in that amplifier 90. The collector of the transistor 150 is connected to the base of another transistor 152. This transistor 152 serves as part of the control amplifier 96 and the battery-charging circuit 94. The battery-charging circuit 94 includes a bridge-type rectifier which is connected across the line 10, which is also protected by a pair of gas tube discharge devices 154. This rectifier circuit assures that the proper polarity of charging current is applied by way of the collector-to-emitter path of a control transistor 156 at the subscriber terminal battery 158. A resistor capacitor network having a long time constant is connected to the base of the transistor 156. The base is also connected to the collector of the control circuit transistor 152 via a diode 160.

In the absence of carrier signal, the transistor 150 will be biased to saturation, The base of the transistor 152 will then be at approximately ground potential (viz −B). The transistor 152 is then nonconductive and the diode 160 is back biased. The base of the transistor 156 then has a positive polarity voltage applied thereto and the transistor 156 is conductive. Accordingly, the battery 158 will charge due to the passage therethrough of current from the line 10.

When a carrier signal appears at the input of the amplifier 90, the transistor 150 functions as an amplifier for the carrier signal. The transistor 152 in the control circuits 96 further amplifies the signal but is driven to saturation on each cycle of the carrier wave. Accordingly, a direct current potential is established across a capacitor 164 which is connected across the transistor 152. This potential is negative with respect to +battery at the junction of the capacitor 164 and the diode 160. Accordingly, the transistor 156 becomes cut off, thereby disconnecting the charging circuit from the batter 158. The resistor capacitor circuit 161 in the charging circuit 94 provides a long time constant which precludes the rapid connection or disconnection of the charging circuit to allow the release of physical line circuits in central office before charging of the battery 158 takes place.

The ringing amplifier 92 is a three-stage amplifier including transistors 166, 168 and 170. The output of the final stage amplifier 170 is coupled across the ringer terminal R and Y of the carrier telephone instruments 68 and 70. During ringing, the pulse-modulated carrier wave is amplified in the control amplifier 90, including the transistors 150 and 152, and is applied to the ringing amplifier 92 at the base of the transistor 166. A transient suppression circuit 172, including a diode and a resistor in parallel with the capacitor is provided at the input of the amplifier 92. In the event that a transient burst of carrier signal or another transient voltage spike appears at the input of the amplifier 92, these will be shunted to ground through the circuit 172. Thus, spurious effects will not cause the ringing amplifier 92 to produce an output. Bell tapping will then be eliminated. During normal ringing operations, the circuit 172 operates as a peak-detector circuit. A charge will be built up across the capacitor therein which will back bias the diode and effectively decouple the circuit 172 from the input of the amplifier 92. The ringing signal modulated carrier will, however, be amplified and each pulse of modulated carrier will produce another sample of ringing current inasmuch as the ringing transformer and ringing coil of the telephone instruments follow only the pulse modulation of the carrier at the ringing frequency and are unresponsive to the high frequency components thereof.

The ringing amplifier is cut off when any of the carrier telephones 68 or 70 goes off hook. The sensing circuit 86 then shorts out the base of 168 via the diode 184 causing transistor 168 in the ringing amplifier to inhibit the amplifier. The sensing circuit 86 includes a transistor 174. The emitter of that transistor is connected to the B+ terminal of the battery and thence through a sensing resistor 176 and one of the input coils of the hybrid 72 to the carrier telephone line. The collector of the transistor 174 is returned to ground through the resistor base biasing circuit 180 of transistor 178.

When a carrier telephone goes off hook, current flows from the battery 158 through the sensing resistor 176 to the transmitter of the carrier telephone. Voltage crop across the sensing resistor 176 is applied to the base of the transistor 174 via the resistor 182. The transistor 174 is then driven into conduction. The base of the transistor 168 in the ringing amplifier is therefore connected to the B+ line via the collector-emitter path of the transistor 174 and a diode 184 which at that time becomes forward biased. Accordingly, the transistor 168 is cut off and ringing is inhibited.

The sensing circuit 86 also serves to enable the oscillator 64 when either of the carrier telephones goes off hook. When the transistor 174 in the sensing circuit is driven into conduction, a positive bias is applied to the base of the transistor 178 in the oscillator 64. The oscillator transistor is then forward biased and oscillations commence. It will be noted that the oscillator transistor 178 is controlled by the sensing circuit 86 and is on idle condition without the base bias voltage. The sensing circuit 86 also functions as a dialing gate circuit and ring trip circuit. During dialing, the current path through the sensing resistor 176 is broken via the dial contacts in the carrier telephone. The carrier oscillator is therefore conditioned to conduct on a pulse basis, each pulse corresponding to a successive dialing pulse. Dialing information is therefore transmitted to the line 10 and thence to the central office terminal. The transmit amplifier 74 assures that all transmitted carrier signals have the necessary transmission level repeaters or other line amplifiers are therefore not necessary and the carrier system may operate over long lines utilizing the amplification provided in the amplifiers at the subscriber terminal and central office terminal alone.

From the foregoing description, it will be apparent that there has been provided an improved telephone system which is particularly adapted to provide private line carrier service over existing telephone lines. While an exemplary embodiment of a system which is constructed in accordance with the invention has been depicted for purposes of illustrating invention, it will be appreciated that variations and modifications in this system may suggest themselves to those skilled in the art. Accordingly, the foregoing description should be taken merely as illustrative and not in any limiting sense.

What is claimed is:

1. A telephone system for providing a carrier channel over an existing voice frequency telephone line which is adapted to have a plurality of physical telephone sets connected thereto, said system comprising a. a central office terminal at one end of said existing line, b. a subscriber terminal at the opposite end of said existing line, c. said central office terminal having a first carrier frequency oscillator, d. said subscriber terminal having a second carrier frequency oscillator, e. said terminals each having a transmit channel including a different one of said first and second oscillators and a receive channel coupled at one end thereof to said line, the opposite end of said central office channel being connected to a telephone circuit which provides voice frequency signals for transmission to said transmit channel and receives voice frequency signals from said receive channel, the opposite end of said subscriber terminal channels being coupled to a telephone set, f. means for connecting a voice frequency telephone line circuit to said line for direct voice frequency communications with said physical telephone sets, g. means for applying direct current potential to said existing line, h. a battery in said subscriber terminal, i. means for charging said battery from said existing line direct current, j. control means for said first oscillator connected to said central office terminal receive channel and to said line for rendering said first oscillator operative to apply a carrier signal to said line when either any of said physical telephone sets goes off hook or when a carrier signal is received by said receive channel from said subscriber terminal, and k. control means for said charging means connected to said subscriber terminal receive channel for disconnecting said battery from said line when a carrier signal is received by said subscriber terminal receive channel.

2. The invention as set forth in claim 1 including means responsive to an off-hook condition of the telephone set connected to said subscriber terminal for rendering said second oscillator operative to apply a carrier signal to said existing line.

3. The invention as set forth in Claim 2 wherein said off-hook condition responsive means includes a coupling circuit for connecting the transmitter of said subscriber telephone set to said subscriber terminal channels including a current path between said battery and said transmitter, and a gate circuit connected to said second oscillator and to said coupling circuit for inhibiting said second oscillator in response to current flow in said coupling circuit.

4. The invention as set forth in claim 1 including a ringing amplifier connected to said subscriber terminal receive channel and to said subscriber terminal telephone set for applying said carrier, which is modulated by ringing frequency current from said telephone circuit in said central office terminal transmit channel, to said last-named set.

5. The invention as set forth in Claim 4 wherein said subscriber terminal receive channel includes a demodulator for translating said modulated carrier into voice frequency signals, said ringing amplifier being coupled to said subscriber terminal receive channel between said demodulator and the existing line connected end of said subscriber terminal receive channel whereby said modulated carrier is coupled to said ringing amplifier.

6. The invention as set forth in claim 5 including means responsive to an off-hook condition of the telephone set connected to said subscriber terminal for inhibiting said ringing amplifier.

7. The invention as set forth in claim 1 wherein said first oscillator control means includes control circuits for said first oscillator, and means included in said means for connecting said voice frequency telephone line circuit to said line for operating said control circuits in response to said off-hook condition of said existing physical telephone sets.

8. The invention as set forth in claim 7 wherein said means included in said line circuit connecting means is a relay.

9. The invention as set forth in claim 8 wherein said line circuit connecting means comprises a low-pass filter, the coil of said relay comprising an inductive element of said filter.

10. In a telecommunication system including an exchange having a transmitter for applying carrier and voice frequency signals to a telephone line and a receiver receiving carrier and voice frequency signals from the telephone line, a telephone set connected to the line, and a carrier terminal including a transmitter for applying carrier signals to the telephone line and a receiver for receiving carrier signals from the telephone line, a power system for energizing said telephone and carrier terminal comprising:

means in said exchange for applying a unidirectional energizing potential to said line;

battery means for providing a source of energizing potential for said terminal;

charging circuit means for charging said battery means from the unidirectional energizing potential applied to said line;

detection circuit means for detecting when the telephone is off hook and causing said exchange transmitter to apply a carrier signal to the line while the telephone is off hook, and circuit means responsive to a carrier signal on said line for inhibiting said charging circuit means while the carrier signals are present on said line.

11. The power system defined in claim 10 wherein said detection means detects the presence of direct current flow through the line due to the off-hook condition of the telephone.

12. A power system as defined in claim 11 wherein said detection means comprises at least one relay coil connected in series with the telephone line so that said relay is actuated when the telephone goes off hook, and contacts of said relay when activated actuate the exchange transmitter to apply a carrier signal to the line.

13. A telephone communication system comprising:

a telephone line;

a telephone exchange connected to said line including carrier transmitter and receiver sections, means for applying battery potential to said line, and means for applying voice signals to said line and receiving voice signals from said line;

at least one telephone set connected to said line;

a subscriber carrier terminal connected to said line including carrier transmitter and receiver sections, a battery, and means for charging said battery from the potential applied to the line by said exchange;

means in said exchange for detecting when a telephone set has gone off hook and enabling the terminal transmitter section to apply a carrier signal to the line, and means in said terminal for detecting the presence of a carrier signal on said line for inhibiting said charging means.

14. The power system as defined in claim 13 wherein said detection means detects the presence of direct current flow through the line due to the off-hook condition of the telephone.

15. A power system as defined in claim 14 wherein said detection means comprises at least one relay coil connected in series with the telephone line so that said relay is actuated when the telephone goes off hook, and contacts of said relay when activated actuate the exchange transmitter to apply a carrier signal to the line.